United States Patent [19]

Hoss

[11] Patent Number: 5,412,192
[45] Date of Patent: May 2, 1995

[54] RADIO FREQUENCY ACTIVATED CHARGE CARD

[75] Inventor: Robert J. Hoss, Cave Creek, Ariz.

[73] Assignee: American Express Company, New York, N.Y.

[21] Appl. No.: 94,753

[22] Filed: Jul. 20, 1993

[51] Int. Cl.⁶ .................. G06K 19/067; G08B 5/22
[52] U.S. Cl. .................. 235/380; 235/487; 340/825.44
[58] Field of Search ........... 235/380, 382, 382.5, 235/435, 439, 449, 492; 340/825.54

[56] References Cited

U.S. PATENT DOCUMENTS

| | | |
|---|---|---|
| 4,353,064 | 10/1982 | Stamm . |
| 4,403,138 | 9/1983 | Battarel et al. .................. 235/487 |
| 4,473,825 | 9/1984 | Walton . |
| 4,650,981 | 3/1987 | Foletta . |
| 4,700,186 | 10/1987 | Fujino et al. . |
| 4,782,342 | 11/1986 | Walton . |
| 4,795,898 | 1/1989 | Bernstein et al. . |
| 4,797,541 | 1/1989 | Billings et al. . |
| 4,798,322 | 1/1989 | Bernstein et al. . |
| 4,868,373 | 9/1989 | Opheij et al. . |
| 4,876,535 | 10/1989 | Ballmer et al. . |
| 4,916,296 | 4/1990 | Streck .................. 235/454 |
| 4,924,171 | 5/1990 | Baba et al. . |
| 4,947,163 | 8/1990 | Henderson et al. .................. 340/825.31 |
| 5,192,947 | 3/1993 | Neustein .................. 340/825.44 |

FOREIGN PATENT DOCUMENTS

| | | | |
|---|---|---|---|
| 2647929 | 12/1990 | France .................. | 235/487 |
| 2-109188 | 4/1990 | Japan .................. | 235/487 |
| 2180677 | 4/1987 | United Kingdom .................. | 235/487 |

Primary Examiner—Donald Hajec
Assistant Examiner—Edward H. Sikorski
Attorney, Agent, or Firm—Snell & Wilmer

[57] ABSTRACT

A system for changing the activation status of a selected data card such as a charge card by broadcasting an appropriate RF signal. An antenna embedded in the card detects and decodes the signal, and operates a transducer which changes the card appearance, alters magnetic stripe information, or alters the information contained within the card.

1 Claim, 6 Drawing Sheets

RADIO FREQUENCY ACTIVATED CHARGE CARD

TECHNICAL FIELD

This invention relates to charge (credit or debit) cards and, more particularly, to a data card whose size is that of a conventional charge card and which is remotely controllable by a broadcast signal.

BACKGROUND ART

It is known in the prior art to modify a data card, e.g., a charge card, when it is inserted in a terminal for data entry. However, until the cardholder actually uses the card, the information on and status of the card generally remain fixed.

This is true even of prior art memory cards which contain microelectronic circuitry for transferring information between the card and a data processing terminal, for example, U.S. Pat. No. 4,868,373 in the names of Opheig et al. Another prior art memory card is described in U.S. Pat. No. 4,795,898, in the names of Bernstein et al. This patent discloses a personal memory card which is the size of a standard plastic credit card and includes a processor, an electrically erasable field-programmable read-only memory, circuitry for inductively receiving a power signal, and circuitry for capacitively transferring data signals between the card and a card reader/writer located in an associated station. Again, the card must be brought in proximity of the card reader/writer for the transfer of status or activation information.

Paging systems provided in the prior art enable a user to detect a radio frequency (RF) or other broadcast signal, but are much larger than a charge card. Also, while they display a message, they do not contain transducers which permanently or temporarily change the actual status or validation of the device. Thus, although a message can be provided to the user of the paging system, the pager itself does not change its mode of operation upon receipt of a broadcast signal.

It is a primary object of the present invention to provide a new and improved data card whose status, information content and/or activation can be modified by a broadcast signal.

It is yet another object of the present invention to provide a new and improved data card for displaying a broadcast message.

Further objects, features and advantages of the invention will become apparent from the following description.

SUMMARY OF THE INVENTION

Briefly stated, and in accordance with one embodiment of the invention, a data card, whose shape is that of a conventional charge card, includes an on-board antenna for detecting an RF signal transmitted from a remote source, and responds to it by operating a transducer which in turn alters a characteristic of, or information contained within, the data card. (In general, changing a characteristic, e.g., the visual appearance of a card, or its activation, or its information content are referred to collectively as a change in status.) The transducer, for example, may discolor the card to indicate that it is no longer valid, or may change a bit in the magnetic stripe. The card may also respond by displaying some other kind of information, e.g., the telephone number of the closest regional service office of the card issuer. The card can be a standard contact or contactless "smart card" in which the information contained within the "smart" chip memory or the activation of the smart chip itself is controlled by an RF signal. Power for the card electronics can be derived from a flat battery within the card, or a solar cell, or even from an alternating magnetic field generated by a card reader.

BRIEF DESCRIPTION OF THE DRAWINGS

The present invention will be readily understood from the following detailed description, taken in conjunction with the accompanying drawings, in which:

FIG. 3b is a sectional view taken along line 3b—3b of FIG. 3a;

FIG. 4b is a sectional view taken along line 4b—4b of FIG. 4a;

FIG. 5b is a sectional view taken along line 5b—5b of FIG. 5a;

FIG. 6b is a sectional view taken along line 6b—6b of FIG. 6a.

DETAILED DESCRIPTION OF THE DRAWINGS

Figure 1:
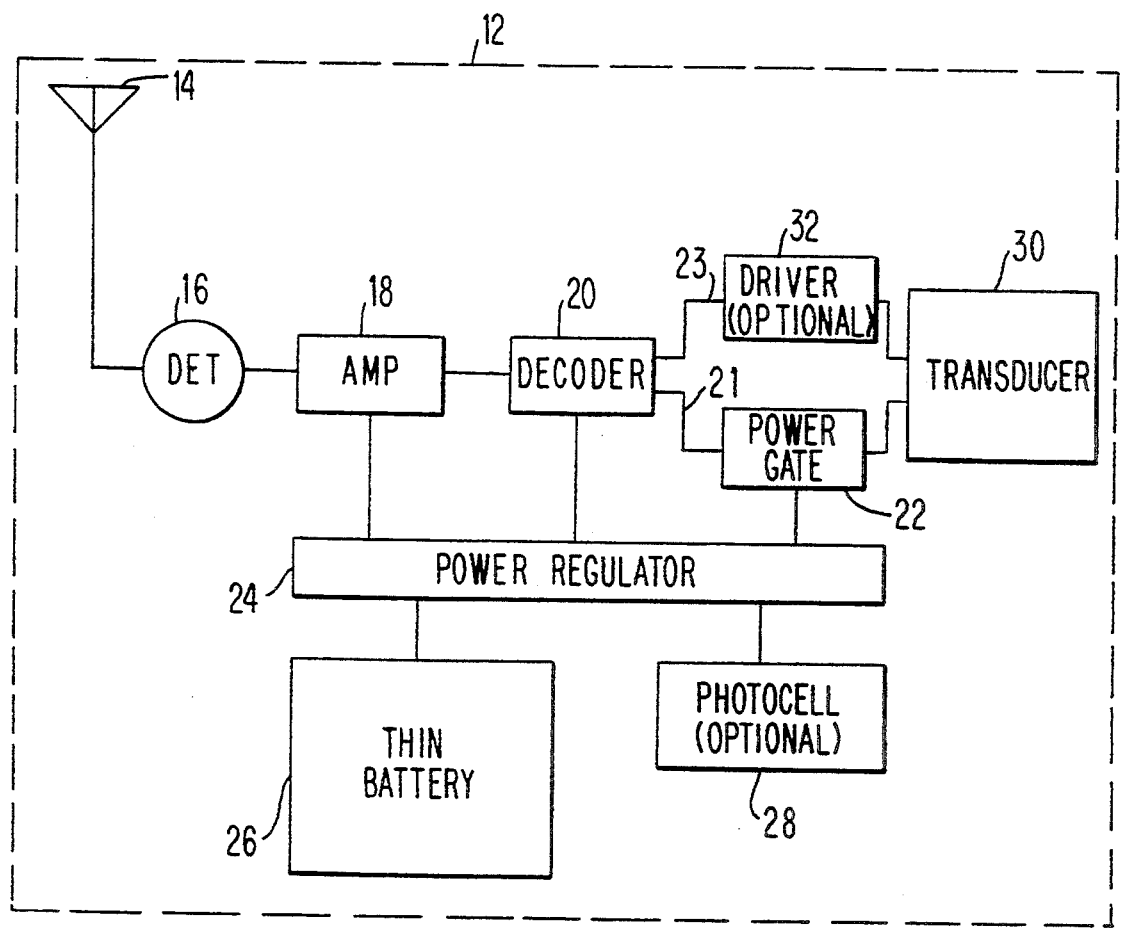
FIG. 1 is a block diagram of the components provided on a wallet-size data card of the present invention.

FIG. 1 illustrates the functional circuit elements of a wallet-size data (credit or debit) card of the present invention. An RF signal is broadcast from a remote source 10 and is picked up on the data card 12 by antenna 14. The RF signal source 10 can be an FM radio station, a low earth orbiting satellite, a dedicated transmitter, or any other broadcast source.

After being detected by RF detector 16 and amplified by amplifier 18, the incoming RF signal is decoded by decoder circuit 20. The decoding step includes recognition of a card identification code, much as a conventional pager recognizes when a received transmission is addressed to it. In response to addressing of the card and an appropriate command, decoder 20 suitably applies an appropriate control signal to a power gate 22 through conductor 21, whereupon gate 22 extends power from regulator 24 to transducer 30. Transducer 30, as will be described in greater detail below, is designed to alter a characteristic indicative of the status or activation (validation) of card 12. Power for regulator 24 is derived from thin battery 26, or an optional photocell 28. Photocell 28 can be used either as an independent source of power or as a means to recharge battery 26.

In some applications, the command signal from decoder 20 may also be extended along line 23 to driver circuit 32 to effect additional changes. For example, if transducer 30 takes the form of a liquid crystal display, the signal fed through driver circuit 32 can be used to change the display. Typically, the display might be altered to indicate the telephone number of the card issuer's office in the geographic area served by the RF broadcast.

Figure 2:
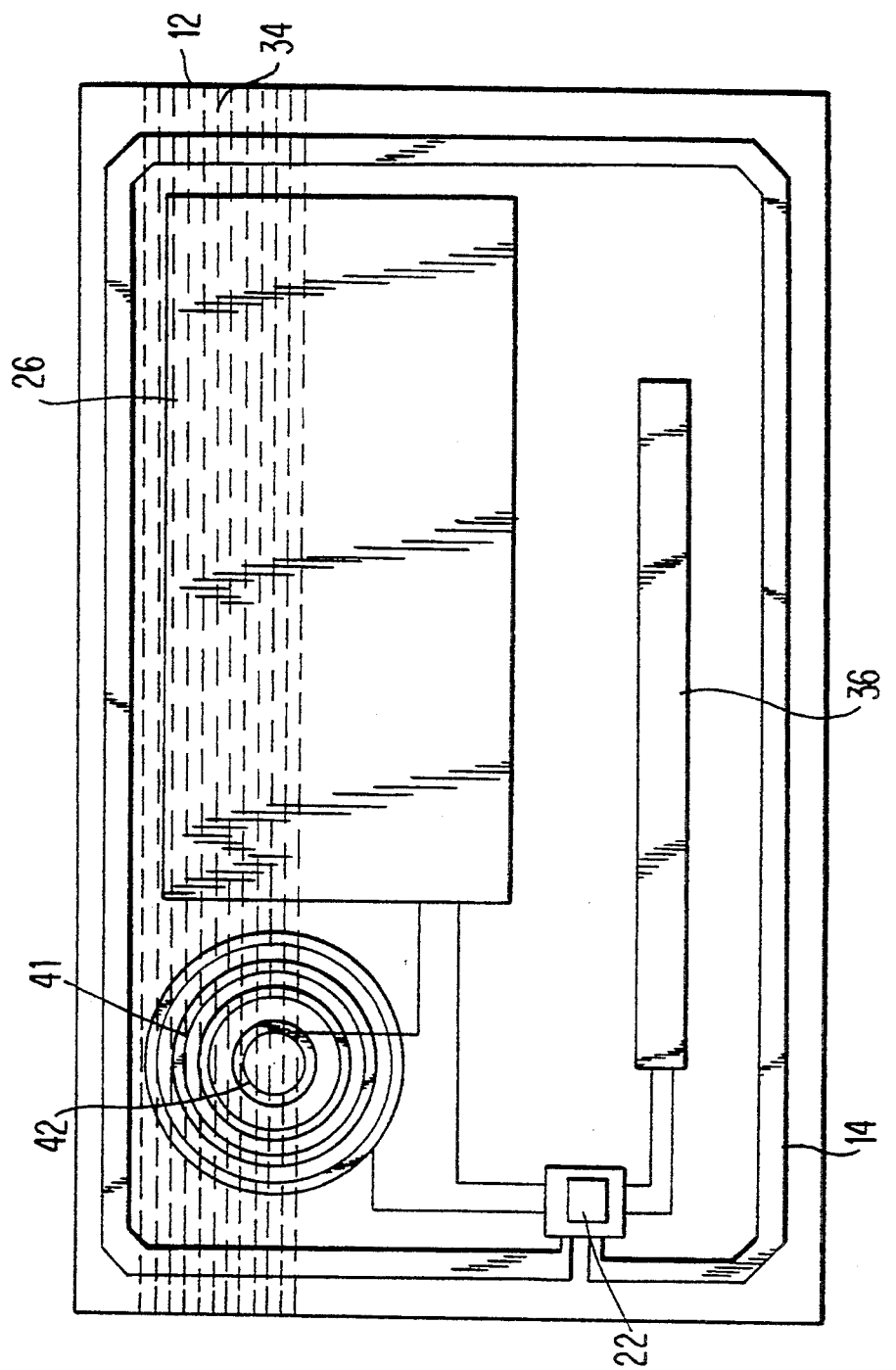
FIG. 2 is a schematic illustrating a physical realization of the block circuitry depicted in FIG. 1.

A schematic illustration of the components shown in block format in FIG. 1 is depicted in FIG. 2. Card 12 includes a magnetic stripe 34 as is well known in the art. Magnetic stripe 34 contains information readable by point-of-sale terminals, teller machines, data readers, etc. and often contains information such as whether the card is valid or invalid. Transducer 30 of FIG. 1 comprises a coil 41 around a ferrite slug 42 within the laminated card, and is positioned over the magnetic stripe 34 so as to focus a magnetic field over the bit information in the stripe that is to be altered. Card 12 in FIG. 2 also includes a liquid crystal display area 36 laminated within the card. The blocks of FIG. 2 are included in integrated circuit 22, and the chip is powered by battery 26 within the card.

In operation, an RF signal is received by loop antenna 14. Depending upon the nature of the received RF signal, the display can be changed. This type of signal is useful, for example, when a card user travels to a new city and information pertinent to that city would be helpful to the cardholder. A message, common to all cardholders in that geographic region, might thus be made to appear on all of their cards.

The received RF signal may also contain coded commands for powering transducer coil 41. The resulting magnetic field alters the orientation of the ferrite material and therefore the information on magnetic stripe 34. For example, such a field could de-activate the card so as to render it useless.

Figure 3A:
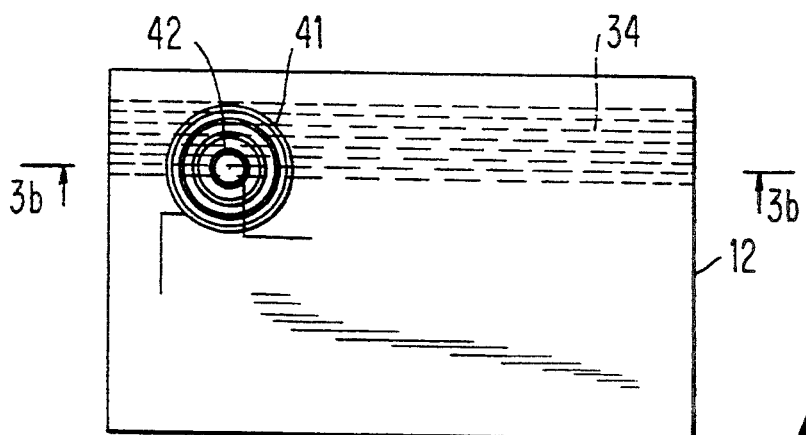
FIG. 3a is a schematic illustration of an alternative embodiment of the present invention in which an electromagnetic field is created over a small region of a magnetic stripe on the card to alter the information provided therein.
Figure 3B:

Referring now to FIGS. 3a and 3b, the transducer of FIG. 2 is shown in cross-section as well as in plan view. Coil 41 is positioned over magnetic stripe 34. Ferrite slug 42 forms the core of the coil and aids in focusing the magnetic field over a section of magnetic stripe 34 that contains the information to be altered. It should be noted that the energy stored in the battery may be minimal, e.g., just sufficient to generate a single brief pulse to permanently invalidate the card. However, providing a battery which allows multiple transducer powerings (in addition to constant detector operation) is preferred. For example, this would allow a card to be revalidated upon transmission of an appropriate command.

A cardholder whose account is in arrears might take steps to shield his card at all times so that it cannot be de-activated remotely. One way to overcome this is to provide unshielded card readers, i.e., when the card is actually used, it can be de-activated by the RF broadcast signal. Another alternative is for the card to automatically de-activate itself unless it periodically detects the RF signal; shielding the card would in this case be self-destructive.

Figure 3C:
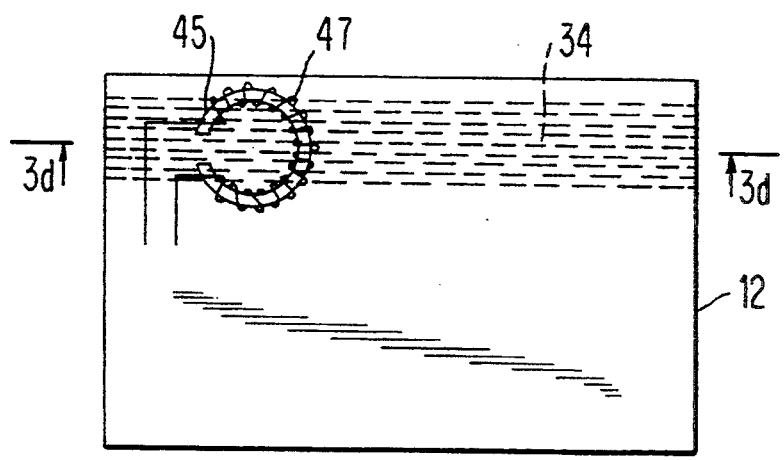
FIG. 3c is a schematic illustration of another alternative embodiment of the present invention.
Figure 3D:
FIG. 3d is a sectional view taken along line 3d—3d of FIG. 3c.

FIGS. 3c and 3d represent a slightly different configuration. Here, a ferrite core 45 is provided with a wound coil 47, either physically wound or printed, with the core gap being positioned above the magnetic stripe area to be affected. The principle of operation, however, is the same as that of the embodiment of FIGS. 3a and 3b.

Figure 4A:
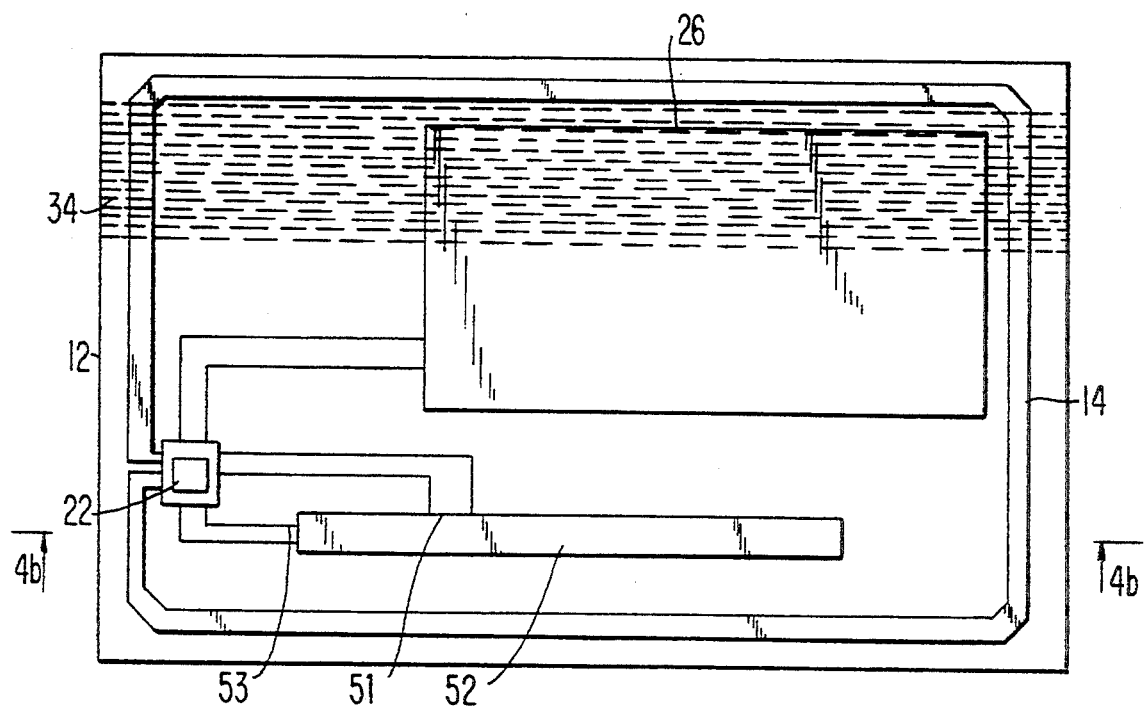
FIG. 4a is a schematic illustration of another embodiment of the present invention in which information on a liquid crystal display of a data card is altered.
Figure 4B:
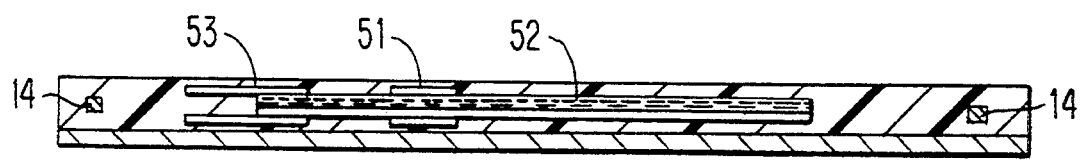

Another embodiment of the present invention is schematically illustrated in FIG. 4a and is shown in a cross-section in FIG. 4b. Here, a liquid crystal display element 52 displays a number, message, code or colored area on the surface of the card to indicate status to the user or a merchant. When the card detects an appropriate RF signal, power is gated from the battery to leads 51 on the liquid crystal display element. Code signals on leads 53 change the markings or color of the display and thereby indicate the changed status of the card. (A switch between white and black is considered herein to be a change in color.) Depending on the display technology used, the display can include memory or a hysterisis effect, and therefore the display can be made to draw current only during the change of state, thus conserving power and making permanent the new status.

Figure 5A:
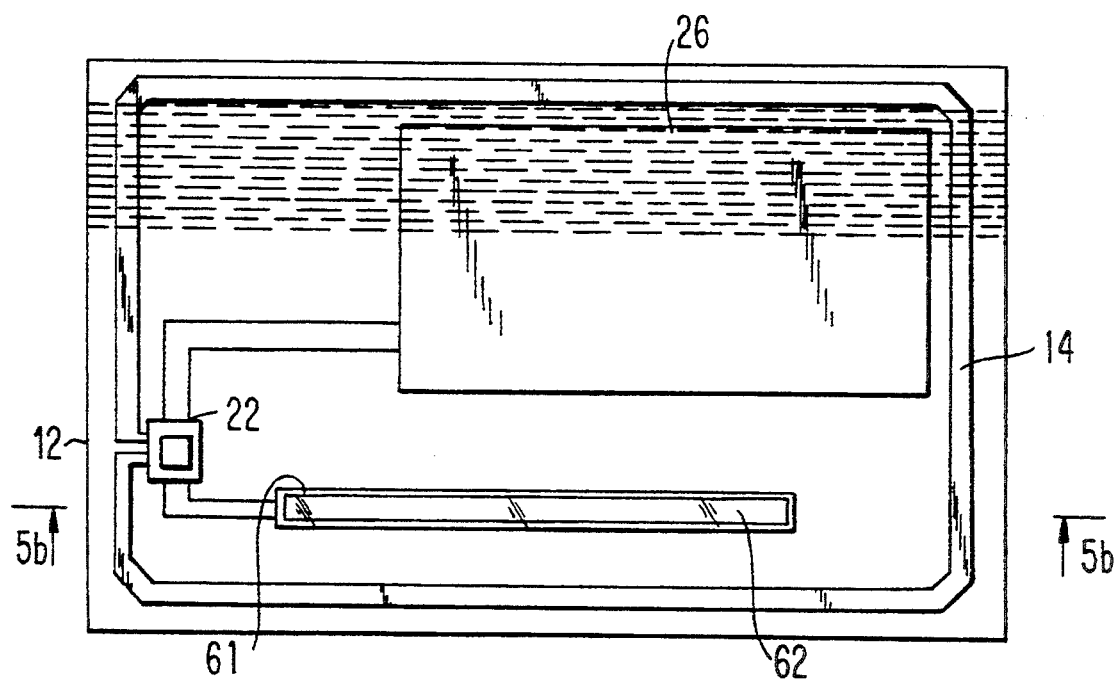
FIG. 5a is a schematic illustration of yet another embodiment of the present invention in which an electrochemical compound is used to change the color of a portion of the card, or in which an electrochemical transducer generates heat to change the physical appearance of a heat-sensitive plastic region of the data card.
Figure 5B:
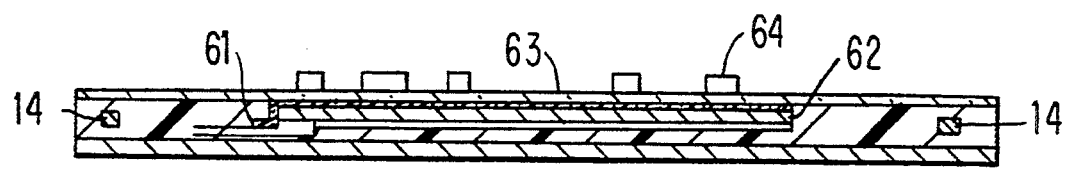

Referring now to FIGS. 5a and 5b, another embodiment of the present invention is schematically illustrated whereby electrochemical or electrooptical transducer 62 is made of a matrix of material such as Nitinol embedded in clear plastic; this material changes color with temperature. The material is covered by plate 61, to which power is supplied, to generate heat, when the card status is to be changed. A clear surface laminate 63 overlays the transparent plate 61. The Nitinol material changes color when heated, giving notice to anyone handling the card that it is no longer valid.

An alternative operating mode for the embodiment of FIGS. 5a and 5b is to change the card status by physically altering the card. When current flows through plates 61 of electrochemical transducer 62, it creates heat in the region of heat sensitive plastic 63. The heat sensitive plastic shrinks and thus highlights raised characters 64 on the surface of card 12, thus rendering the card valid or invalid as the case may be.

Figure 6A:
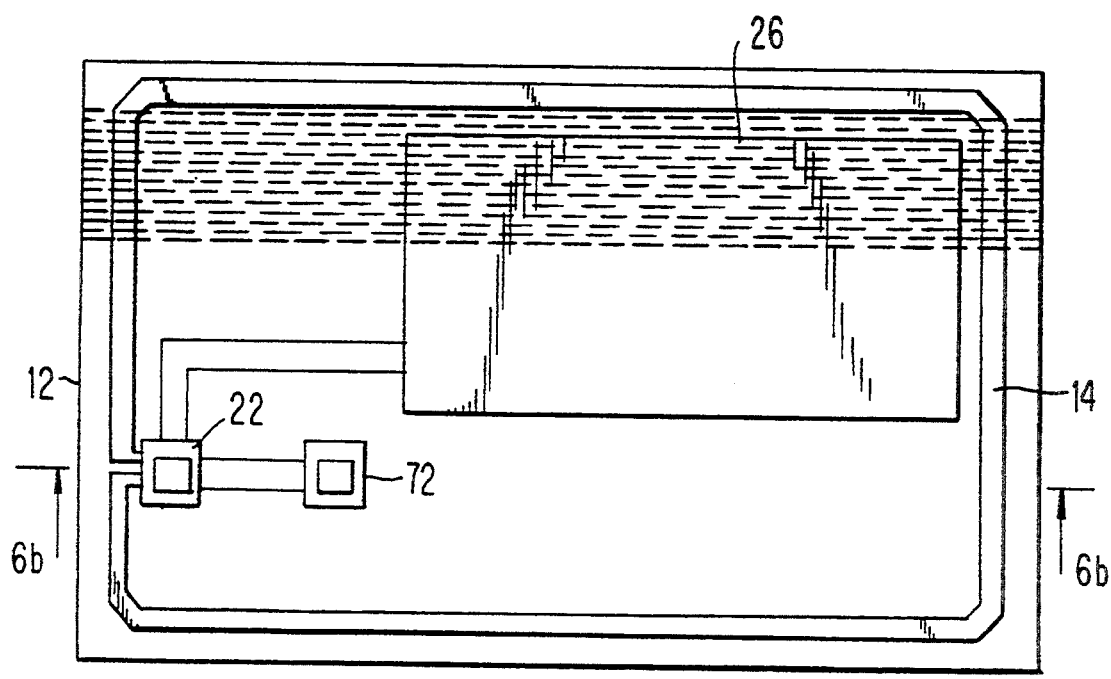
FIG. 6a is a schematic illustration of still another embodiment of the present invention in which the function or information content within a "smart" chip is altered.
Figure 6B:
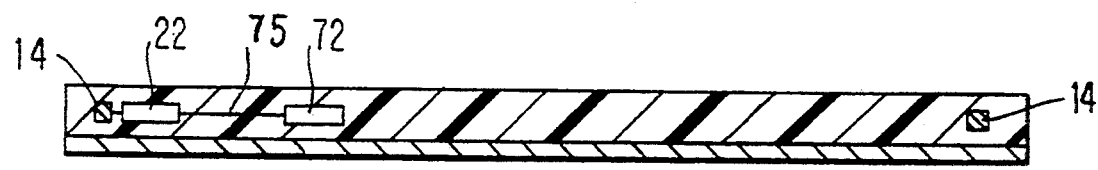

Referring now to the embodiment of FIGS. 6a and 6b, the memory and/or activation of a "smart" card chip would be altered by an RF signal. When the decoded signal flows through conductor 75 it changes the state or information content of "smart" chip 72.

From the foregoing description, it will be apparent that the present invention provides an alterable data card capable of directly detecting and interpreting a unique RF signal transmitted from a remote source. Moreover, it will be further apparent that the invention provides a method for the issuer of a credit card to individually and remotely control its status.

While there have been shown and described what are presently considered to be the preferred embodiments of this invention, it will be apparent to those skilled in the art that various other changes and modifications may be made without departing from the broader aspects of this invention. For example, an active power source could be omitted from the card. Instead, an AC magnetic field from a card reader could power the card, the card including a passive magnetic field pick-up and AC-to-DC converter for deriving a potential to power the chip circuits. Also, if the card includes contacts for interfacing with a reader, an internal fuse between the contacts might be heated and blown for the purpose of de-activating the card. It is therefore to be understood that the aim of the appended claims is to cover all such changes and modifications as fall within the true spirit and scope of this invention.

I claim:

1. An alterable wallet-size data card of the type including a magnetic stripe, the card being capable of responding to a unique RF signal transmitted from a remote source, said data card comprising:

antenna means in the card for detecting said unique RF signal;

means for decoding said unique RF signal upon detection thereof;

transducer means for selectively altering a characteristic of the data card indicative of its status; and means for operating said transducer means, in response to operation of said decoding means, to alter the status of the data card;

wherein said transducer means comprises a magnetic coil positioned over said magnetic stripe, said magnetic coil focusing flux over a portion of said magnetic stripe when said transducer means is operative.

* * * * *